United States Patent
Cui et al.

(10) Patent No.: US 12,483,971 B2
(45) Date of Patent: Nov. 25, 2025

(54) MEASUREMENT GAP (MG) AND INTERRUPTION DESIGN FOR SYSTEM INFORMATION (SI) READING IN MULTIPLE UNIVERSAL SUBSCRIBER IDENTITY MODULE (MUSIM)

(71) Applicant: Apple Inc., Cupertino, CA (US)

(72) Inventors: Jie Cui, San Jose, CA (US); Qiming Li, Beijing (CN); Sethuraman Gurumoorthy, San Ramon, CA (US); Yuqin Chen, Beijing (CN); Yang Tang, San Jose, CA (US); Manasa Raghavan, Sunnyvale, CA (US); Xiang Chen, Campbell, CA (US); Huaning Niu, San Jose, CA (US); Dawei Zhang, Saratoga, CA (US); He Hong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/777,315

(22) PCT Filed: Sep. 24, 2021

(86) PCT No.: PCT/CN2021/120492
§ 371 (c)(1),
(2) Date: Mar. 3, 2023

(87) PCT Pub. No.: WO2023/044824
PCT Pub. Date: Mar. 30, 2023

(65) Prior Publication Data
US 2024/0172096 A1 May 23, 2024

(51) Int. Cl.
*H04W 48/14* (2009.01)
*H04W 88/06* (2009.01)

(52) U.S. Cl.
CPC ............ *H04W 48/14* (2013.01); *H04W 88/06* (2013.01)

(58) Field of Classification Search
CPC ...... H04W 48/14; H04W 88/06; H04W 48/16
(Continued)

(56) References Cited

U.S. PATENT DOCUMENTS 11,272,461 B2 * 3/2022 Lee ..................... H04W 52/286
11,785,632 B2 * 10/2023 Kim ..................... H04L 5/0091
370/329
(Continued)

FOREIGN PATENT DOCUMENTS

CN 106550417 A * 3/2017 ........ H04W 36/0061
CN 109379751 A * 2/2019 ............ H04W 24/02
(Continued)

OTHER PUBLICATIONS

3GPP TSG-RAN WG2 Meeting #115 "LS on gap handling for MUSIM" Rel-17; LTE_NR_MUSIM-Core; Tdoc R2-2108861 Electronic Meeting, Aug. 16-27, 2021.
(Continued)

Primary Examiner — Mahendra R Patel
(74) Attorney, Agent, or Firm — Eschweiler & Potashnik, LLC; Matthew W Glause

(57) ABSTRACT

A user equipment (UE), baseband processor or other network device (e.g., base station, next generation NodeB, etc.) can operate to process or generate measurement gap configurations associated with multiple universal subscriber identity modules (MUSIM) with dual subscriber identify modules (SIMs). A UE can perform a system information request or an SI reading with or without the SI request based on a UE configured interruption or a preconfigured measurement gap configuration to read a system information block (SIB) 1 and at least one other SIB of SI associated with the target network.

18 Claims, 10 Drawing Sheets

(58) Field of Classification Search
USPC ........................................................ 455/434
See application file for complete search history.

(56) References Cited

U.S. PATENT DOCUMENTS

| | | | | |
|---|---|---|---|---|
| 11,963,214 | B2* | 4/2024 | Kanamarlapudi | .... H04W 72/21 |
| 12,191,936 | B2* | 1/2025 | Islam | ................ H04B 7/0417 |
| 2016/0127971 | A1* | 5/2016 | Axmon | ............ H04W 36/0044 |
| | | | | 370/329 |
| 2019/0053135 | A1* | 2/2019 | Hahn | .................... H04W 76/30 |
| 2021/0120524 | A1* | 4/2021 | Palle | .................. H04W 68/005 |
| 2022/0110085 | A1* | 4/2022 | Khoryaev | ............. H04L 5/0051 |
| 2022/0141738 | A1* | 5/2022 | Chou | ............. H04W 36/00837 |
| | | | | 455/437 |
| 2022/0174566 | A1* | 6/2022 | Shreevastav | .......... H04W 48/16 |

FOREIGN PATENT DOCUMENTS

| | | | | |
|---|---|---|---|---|
| CN | 109661031 A | | 4/2019 | |
| CN | 112218354 A | * | 1/2021 | ............... A61L 2/10 |
| CN | 112887963 A | | 6/2021 | |
| CN | 113273250 A | * | 8/2021 | ............ H04W 48/20 |
| WO | 2019139525 A1 | | 7/2019 | |
| WO | WO-2020146739 A1 | * | 7/2020 | ........... H04L 5/0051 |
| WO | WO-2020193616 A1 | * | 10/2020 | ............ H04W 24/02 |

OTHER PUBLICATIONS

International Search Report and Written Opinion, dated Jun. 10, 2022 for International Application No. PCT/CN2021/120492.
International Preliminary Report on Patentability mailed Apr. 4, 2024 in connection with Application No. PCT/CN2021/120492.

* cited by examiner

MEASUREMENT GAP (MG) AND INTERRUPTION DESIGN FOR SYSTEM INFORMATION (SI) READING IN MULTIPLE UNIVERSAL SUBSCRIBER IDENTITY MODULE (MUSIM)

This application is a National Phase entry application of International Patent Application No. PCT/CN2021/120492 filed Sep. 24, 2021, entitled "MEASUREMENT GAP (MG) AND INTERRUPTION DESIGN FOR SYSTEM INFORMATION (SI) READING IN MULTIPLE UNIVERSAL SUBSCRIBER IDENTITY MODULE (MUSIM)", the contents of which are herein incorporated by reference in their entirety.

FIELD

The present disclosure relates to wireless technology including measurement gap (MG) and interruption design for system information (SI) reading in a multiple universal subscriber identity module (MUSIM).

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
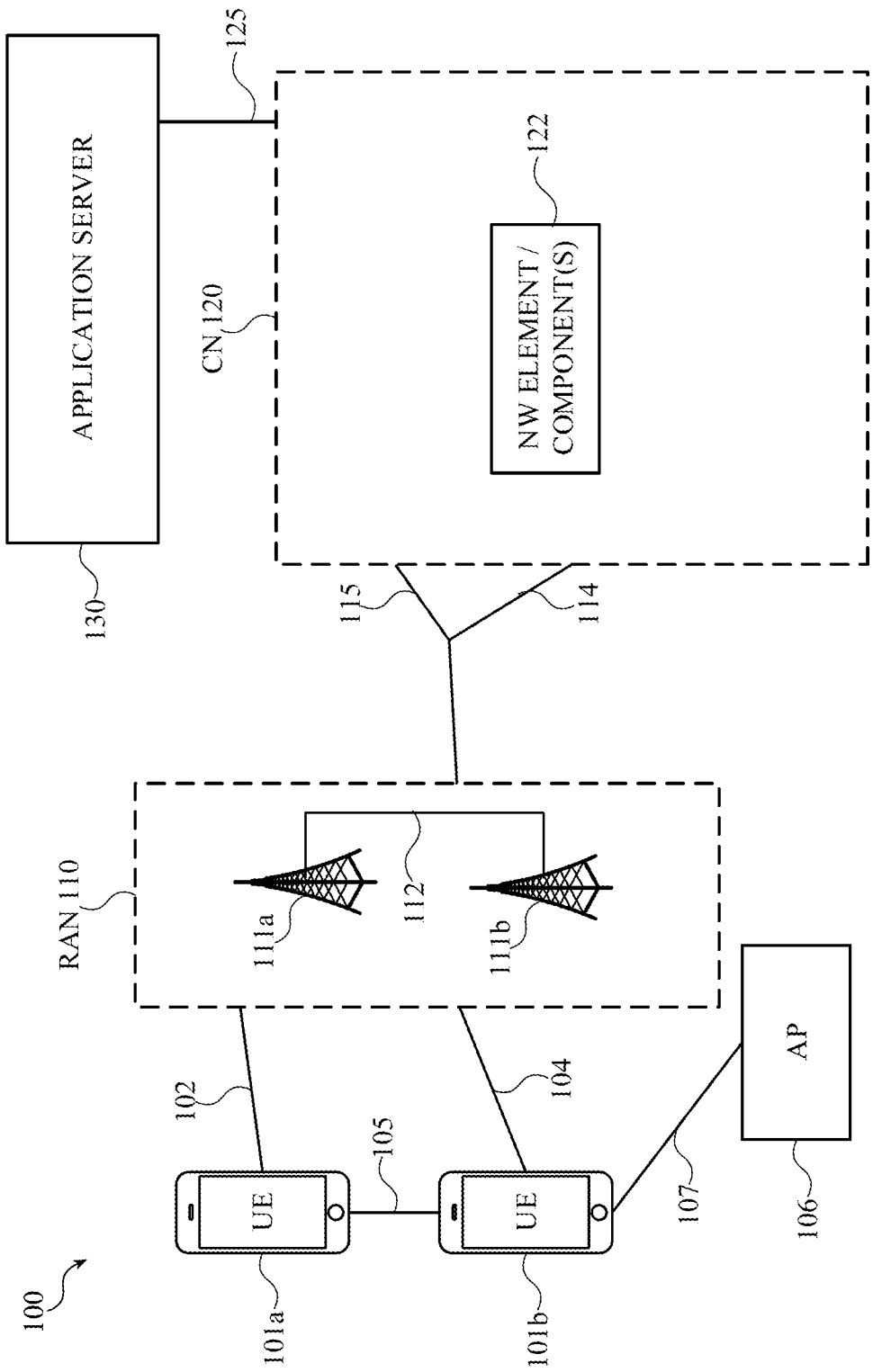
FIG. 1 illustrates an exemplary block diagram illustrating an example of user equipment(s) (UEs) communicatively coupled a network with network components as peer devices useable in connection with various embodiments (aspects) described herein.

Various aspects involving a user equipment (UE) with dual subscriber identity module (SIM) operation in communication procedures with a base station (e.g., next generation NodeB, or other network components) are described herein. 3GPP aims to support various scenarios when a UE comprising multiple universal subscriber identity modules (MUSIM) with a dual SIM card operation is allowed to switch to a target network (e.g., a network B (NW B)) without leaving a connected state at the serving network (e.g., network A (NW A). Each SIM card of the UE enables connection to a different network (NW) so that the UE connects to one network with one or more timing instances, such that data and control information is exchanged between the UE terminal and the network. At a particular time instance, one network can be connected to the UE, although the UE still monitors the other NW (e.g., NW B).

In order to support these various scenarios, 3GPP changes to the gap configuration mechanisms are underway and at most the NW can be allowed to configure three gap patterns, in which an a-periodical measurement gap (AP-MG) and a plurality of periodic measurement gaps (e.g., two) can be configured. Therefore, techniques and mechanism for configuring these measurement gaps (MGs) are needed in order to ensure system information (SI) communication with the various networks is efficient and effective. This can include SI for paging reception, serving cell measurement, neighboring cell measurements including intra-frequency, inter-frequency, and inter-radio access technology (RAT) measurements. In particular, because SI has much more information and configurations for other purposes also (e.g., cell measurements, or other operations), the UE should be able to read this SI for maintaining dual network connectivity in dual SIM operation effectively and efficiently. SI reading can refer to the UE reading the SI to obtain the SIB1 information and one or more subsequent SIBs from downlink control information. An SI request can refer to specific requests being provided for SI reading to be performed, such as to a target network or second network that is not the serving network in a dual SIM operation for MUSIM.

SI is received via a target network (e.g., NW B) in response to an SI request by the UE or without such SI request in various aspects herein. The SI request or a measurement gap configuration for SI reading of the SI can be configured within a-periodic (one-shot) switching with both transmission and reception at the target NW B. Here, the UE does not necessarily enter RRC-connected state with a target network NW B (e.g., no RRC connection Resume/Setup).

Each measurement gap may be associated with a gap configuration, which may indicate properties of the gap used to implement or handle the gap. For example, the measurement gap configuration may indicate the gap pattern, starting position, length, repetition period, etc. The measurement gaps may also need to be activated or released in some instances, and features for performing such are also described herein. For measurement gap configuration and activation of such, the network can configure up to three measurement gap patterns for any MUSIM purpose, although signaling may support more measurement gap patterns, for example. The serving network (e.g., NW A) can be configure the measurement gap configuration to indicate the measurement gap, as a Periodic/Aperiodic/autonomous gap (UE configured measurement gap) configuration and activation to the UE for SI requesting and SI reading. A measurement gap configuration can explicitly provide a measurement gap starting position (e.g., offset value or start SFN and subframe explicitly), measurement gap length and measurement gap repetition period, for example. Measurement gaps (of any type) can further be configured or released by RRC signaling (e.g., RRC Reconfiguration message).

Measurement gaps can be used according to various aspects herein for a UE to request SI on a second/target NW (e.g., NW B) in a dual SIM device and also perform reading of the SI as an SI reading. SI can be particularly utilized for paging reception, serving cell measurement, neighboring cell measurements including intra-frequency, inter-frequency and inter-RAT measurements. In particular, system information blocks (SIBs) other than the main system information block (SIB) 1 are carried in SI messages, which are periodically scheduled in SI window. The period of SI scheduling (si-Periodicity) can be {rf8, rf16, rf32, rf64, rf128, rf256, rf512} radio frames. For NR, the SI window Length (si-WindowLength) range can be {s5, s10, s20, s40, s80, s160, s320, s640, 51280} slots, for LTE the SI window Length (si-WindowLength) range can be {ms1, ms2, ms5, ms10, ms15, ms20, ms40} ms. Synchronization signal/physical broadcast channel (SSB) detection is only utilized for new radio (NR) networking.

When the target network B belongs to NR, and the UE can request the on-demand SIs with an AP-MG based on RACH procedure. For message 1 (MSG1) based on-demand SI procedures with AP-MG, only MSG1 and message 2 (MSG2) transmission and reception are performed as in the random access channel (RACH) procedure for establishing network synchronization. For MSG3 based on-demand SI procedure, all messages (MSG1-MSG4) with transmission and reception are utilized.

For SI reading, various aspects described herein relate to how to use the measurement gap configuration or interruption to receive the SI. Aspects regarding how to use the measurement gap or interruption for SI reading in NW B are described.

Aspects described herein enable use of the measurement gap or interruption for SI requesting and reading in NW B. These aspects can be categorized for description herein as SI reading without an SI request, and SI reading with an SI request. In aspects, for an SI reading and an SI request one or more of nine combinations of aspects can be implemented including: interruption/AP-MG/P-MG based SI requesting and interruption/AP-MG/P-MG based SI reading.

Additional aspects and details of the disclosure are further described below with reference to figures.

FIG. 1 illustrates example architecture of a system 100 of a network, in accordance with various embodiments (aspects). The following description is provided for an example system 100 that can be in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111a, 111b, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In MR-DC, a group of serving cells associated with a master Node can be configured as a master cell group (MCG), comprising of a special cell (SpCell) as a primary cell (PCell) and optionally one or more secondary cells (SCells). An MCG can be the radio access node that provides the control plane connection to the core network (CN) 120; it may be a Master eNB (in EN-DC), a Master ng-eNB (in NGEN-DC) or a Master gNB (in NR-DC and NE-DC), for example. SpCell can either refer to the PCell of the MCG or the primary secondary cell (PSCell) of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as an PSCell and optionally one or more SCells.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access AN nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 5G system 100 (e.g., next generation NodeB (gNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all, or part of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications.

In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. In some instances, the gNB-DUs, gNB-CUs, or other functions of the RAN node 111 may be co-located while in other instances are not co-located and/or operated by different entities. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, UEs 101 and the RAN nodes 111 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, 16).

The RAN nodes 122 may be configured to communicate with one another via interface 123. In implementations where the system 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111a to new (target) serving RAN node 111b; and control of user plane tunnels between old (source) serving RAN node 111a to new (target) serving RAN node 111b. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network-in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage media (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In aspects, the CN 120 can be a 5GC (referred to as "5GC 120" or the like), and the RAN 110 can be connected with the CN 120 via an NG interface 112. In embodiments, the NG interface 112 can be split into two parts, a Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs).

In aspects, where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Core NW elements/components 122 can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

The UPF, for example, can act as an anchor point for intra-RAT and inter-RAT mobility, an external Protocol Data Unit (PDU) session point of interconnect to Data Network (DN), and a branching point to support multi-homed PDU session. The UPF can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF can include an uplink classifier to support routing traffic flows to a data network. A DN can be various network operator services, Internet access, or third-party services, include, or be similar to, an application server. The UPF can interact with the SMF via an N4 reference point between the SMF and the UPF.

The AUSF, for example, can store data for authentication of UE 101 and handle authentication-related functionality. The AUSF can facilitate a common authentication framework for various access types. The AUSF can communicate with the AMF via an N12 reference point between the AMF and the AUSF; and can communicate with the UDM via an N13 reference point between the UDM and the AUSF. Additionally, the AUSF can exhibit an Nausf service-based interface.

The AMF, for example, can be responsible for registration management (e.g., for registering UE 101, etc.), connection management, reachability management, mobility management, and lawful interception of AMF-related events, and access authentication and authorization. The AMF can be a termination point for the N11 reference point between the AMF and the SMF. The AMF can provide transport for SM messages between the UE 101 and the SMF, and act as a transparent proxy for routing SM messages. AMF can also provide transport for SMS messages between UE 101 and a Short Message Service (SMS) Function (SMSF). AMF can act as Security Anchor Function (SEAF), which can include interaction with the AUSF and the UE 101 and/or receipt of an intermediate key that was established as a result of the UE 101 authentication process. Where Universal Subscriber Identity Module (USIM) based authentication is used, the AMF can retrieve the security material from the AUSF.

AMF can also include a Single-Connection Mode (SCM) function, which receives a key from the SEA that it uses to derive access-network specific keys. Furthermore, AMF can be a termination point of a RAN Control Plane (CP) interface, which can include or be an N2 reference point between the (R)AN 110 and the AMF; and the AMF can be a termination point of Non Access Stratum (NAS) (N1) signaling, and perform NAS ciphering and integrity protection.

AMF can also support NAS signaling with a UE 101 over a non-3GPP (N3) Inter Working Function (IWF) interface. The N3IWF can be used to provide access to untrusted entities. N3IWF can be a termination point for the N2 interface between the (R)AN 110 and the AMF for the control plane, and can be a termination point for the N3 reference point between the (R)AN 110 and the UPF for the user plane. As such, the AMF can handle N2 signaling from the SMF and the AMF for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF via an N1 reference point between the UE 101 and the AMF, and relay uplink and downlink user-plane packets between the UE 101 and UPF. The N3IWF also provides mechanisms for IPsec tunnel establishment with the UE 101. The AMF can exhibit an Namf service-based interface, and can be a termination point for an N14 reference point between two AMFs and an N17 reference point between the AMF and a 5G Equipment Identity Register (5G-EIR) (not shown in FIG. 1).

The UE 101 can be registered with the AMF in order to receive network services. Registration Management (RM) is used to register or deregister the UE 101 with the network (e.g., AMF), and establish a UE context in the network (e.g., AMF). The UE 101 can operate in an RM-REGISTERED state or an RM-DEREGISTERED state. In the RM-DEREGISTERED state, the UE 101 is not registered with the network, and the UE context in AMF holds no valid location or routing information for the UE 101 so the UE 101 is not reachable by the AMF. In the RM-REGISTERED state, the UE 101 is registered with the network, and the UE context in AMF can hold a valid location or routing information for the UE 101 so the UE 101 is reachable by the AMF. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF can store one or more RM contexts for the UE 101, where each RM context is associated with a specific access to the network. The RM context can be a data structure, database object, etc. that indicates or stores, inter alia, a registration state per access type and the periodic update timer. The AMF can also store a 5GC Mobility Management (MM) context that can be the same or similar to an (Enhanced Packet System (EPS))MM ((E)MM) context. In various embodiments, the AMF can store a Coverage Enhancement (CE) mode B Restriction parameter of the UE 101 in an associated MM context or RM context. The AMF can also derive the value, when needed, from the UE's usage setting parameter already stored in the UE context (and/or MM/RM context).

Figure 2:
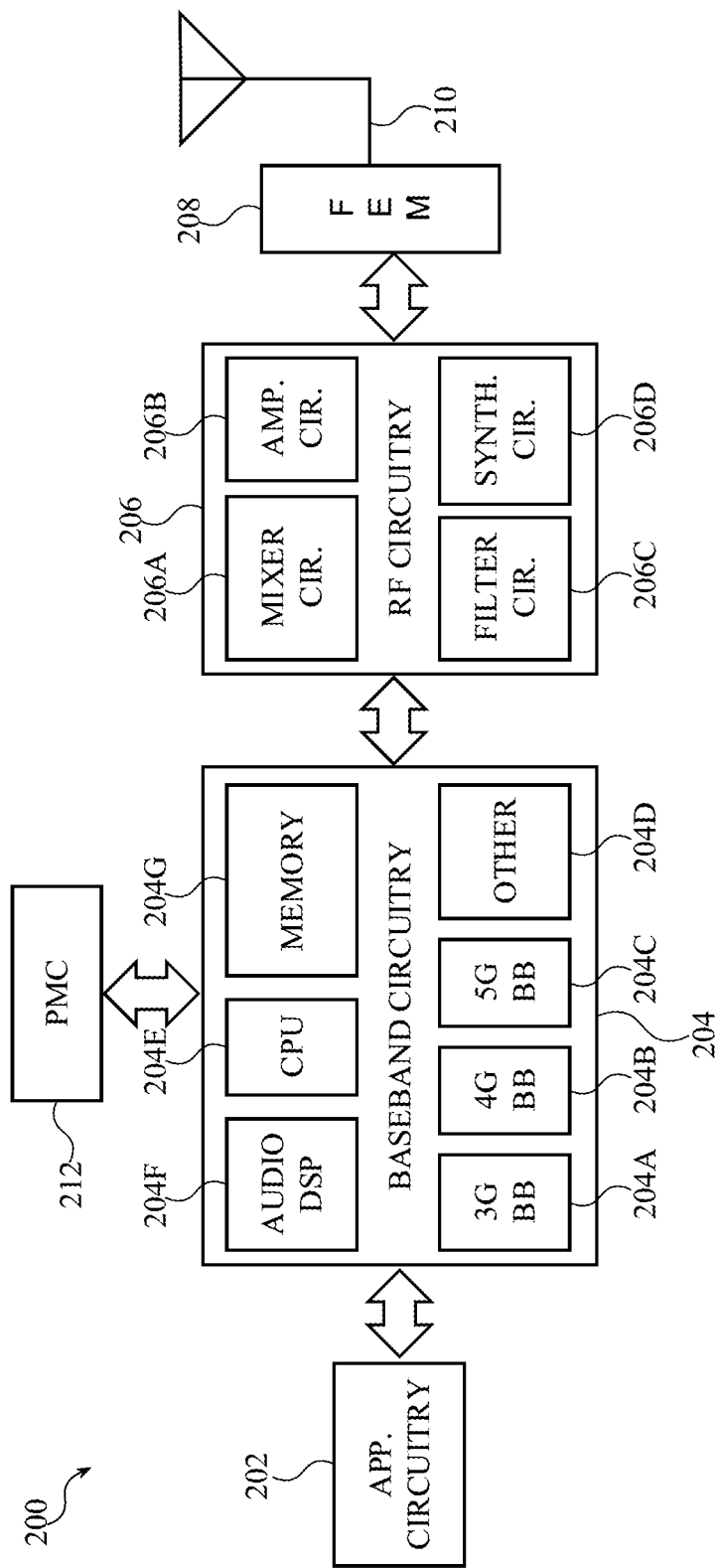
FIG. 2 illustrates a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node cannot utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some, or all of the functionality of baseband processors 204A-D can be included in modules stored in the memory 204G and executed via a Central Processing Unit 204E. Memory 204G can include executable components or instructions to cause one or more processors (e.g., baseband circuitry 204) to perform aspects, processes or operations herein. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some, or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 cannot receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3 (L3), Layer 2 (L2), or Layer 1 (L1) functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Figure 3:
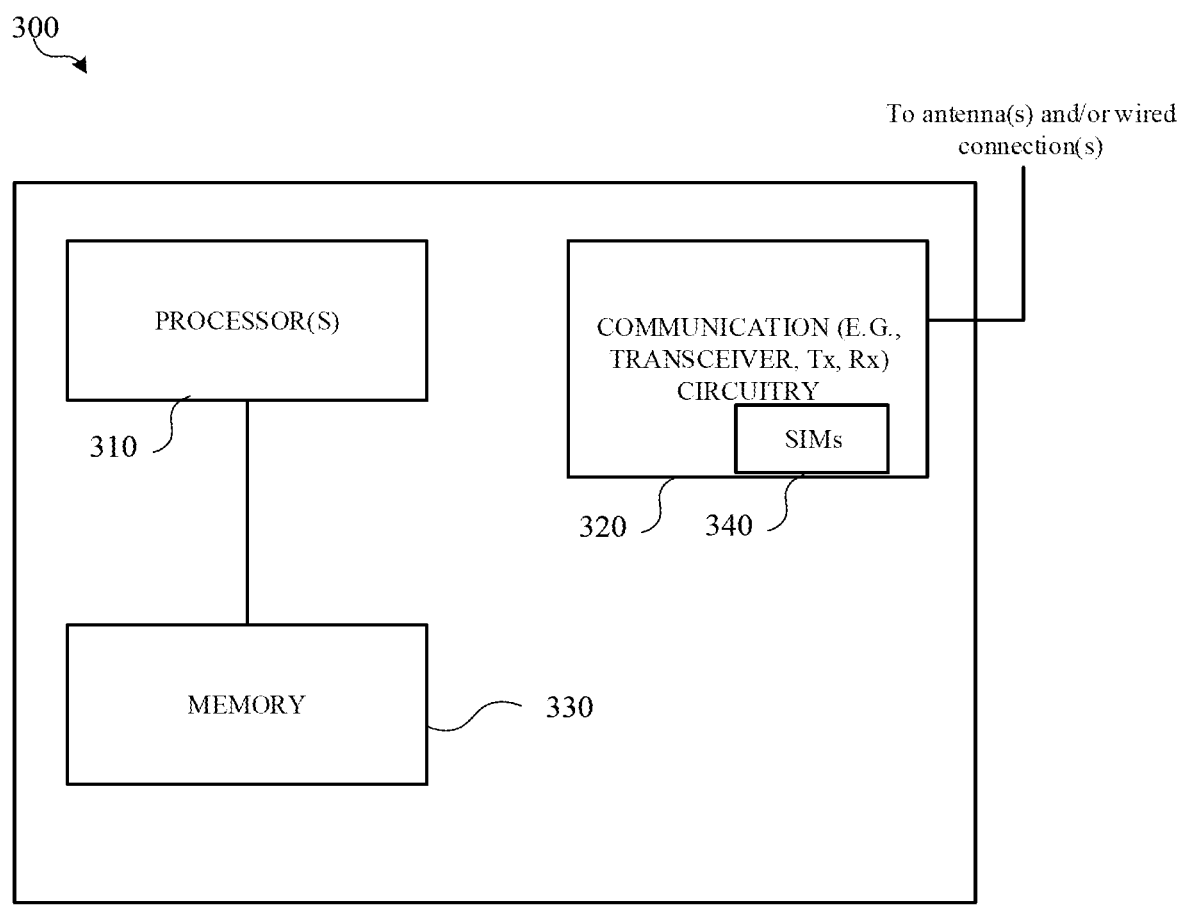
FIG. 3 illustrates an exemplary a simplified block diagram of a user equipment (UE) wireless communication device or other network device/component (e.g., eNB, gNB) in accordance with various aspects.

Referring to FIG. 3, illustrated is a block diagram of a user equipment (UE) device or another network device/component (e.g., gNB, eNB, or other participating network entity/component). The device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320). The transceiver circuitry 320 can further include dual subscriber identity modules (SIMs) 340 for MUSIM that can be coupled with or integrated with processing circuitry of the processor(s) 310 for dual network connections.

Memory 330 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium.

In an aspect, the UE/gNB device 300 can operate to configure by processing/generating/encoding/decoding a physical layer transmission comprising multiple different transport blocks (TBs) based on an unequal protection between the different TBs in a physical layer encapsulation (e.g., EPC packets, a transmission opportunity, MOOT, a single transmission burst, a TTI or other encapsulation protocol or related encapsulation parameter(s) for the encapsulation of data from higher layers into frames for transmission over the air. The physical layer transmission can be received, transmitter, or provide(d) with communication/transmitter circuitry 320 to similarly process/generate the physical layer transmission with spatial layers via a physical channel in an NR network or other networks.

Processor(s) 310 can be components of application/processing circuitry or processor(s) of the baseband circuitry that can be used to execute components or elements of one or more instances of a protocol stack. For example, processor(s) 310 of baseband circuitry, alone or in combination, can be configured to perform various aspects or embodiments for SI request/SI reading. For example, the processing circuitry comprising processor(s) 310 can perform SI request/SI reading of SI information with a target network via a base station (e.g., gNB 111*a*, or other network component) while also being connected to a serving network via another base station (e.g., gNB 111*b*, or other network component). The SI request/SI reading of SI can be based on a UE configured interruption or a preconfigured measurement gap configuration to request/read a system information block (SIB) 1 and at least one other SIB of SI associated with the target (or second connected) network, in accordance with various aspects described herein.

Various modes can be configured via processor(s) 310 including SI reading with or without an SI request in order to switch to a target network (e.g., gNB 111*b*) and monitoring of SI from the target network. The SI reading with or without an SI request can be triggered by the UE 101 alone or by the gNB 111*a* as a serving network/cell with predetermined measurement gap configuration configuring one or more of an aperiodic (AP) measurement gap (MG) configuration or a periodic MG (P-MG) pattern, for example. Configuration with AP-MG configuration can include a one-shot switching from the serving network to the target network such that the UE 101 does not enter into an ACK/NACK mode of communication or enter into an RRC-connected state (e.g., no RRC connection Resume/Setup) with the target network, including an on-demand SI request. With AP-MGs the UE 101 can switch from the serving network to the target network in a one time event as a one-shot switching mechanism so that the UE 101 switches once to provide an SI request to the target network, read the SIB1/other SIB at each instance independent of one another while switching back to the serving cell before reading another instance or making any further request. For example, the UE 101 can request some SI information from target network, but this request is a one time or one shot event, which means the UE performs aperiodic switching from the serving network to the target network to provide the request and then tune back to the serving network. When SI is ready the UE can then switch back to NW B for the reception based on either another measurement gap instance (e.g., AP-MG, P-MG, or autonomous interruption).

In legacy NW or UE behavior, the UE read the master information block (MIB) or the SIB1 of the SI because the key information is carried on the MIB and SIB 1 for one cell; as such the UE will at most read this MIB and SIB1 from a neighbor cell. However, with MUSIM when UE is operating on two SIM cards, even though the second network (as target network for SI reading/request) is currently connected or being monitored, this network is not the real or primary serving cell to UE 101, but the UE still needs to monitor the SI on this target connected network. Then different from the MIB and SIB 1, the UE 101 is preconfigured to monitor the SI other than the SIB1, such as SIB2, SIB3, or up to potentially SIB 15 or beyond. Many SIBs can be carried in the IS of each network cell, but legacy operations do not necessarily require the UE 101 to monitor all of the SIBs of the SI for the neighbor cell. As such, with MUSIM the UE could be required to monitor all of the SI, and thus, effective and efficient mechanisms are demanded.

In aspects related to the third scenario for configuring one shot/AP-MG, up to three gaps can be configured, one AP-MG, and up to two P-MG patterns, so that two different embodiments can be configured via processor(s) or other components: a message 1 (MSG1) based on demand SI procedure and a message 3 (MSG3) based on demand SI procedure. MSG1 based on demand SI procedure refers to the UE 101 communicating an SI request on message 1 of the synchronization procedure with RACH, for example, and receives a response on message 2 (MSG2). In this case, an SI request is completed by completing Message 1 (MSG1) transmission and Message 2 (MSG2) reception, both being successful to successfully request the SI from the target network of the base station (e.g., gNB 111*b*). MSG3 based on demand SI procedure utilizes all MSG1-MSG4 transmissions and receptions, respectively, to successfully complete the SI request with the target/second network.

Figure 4:
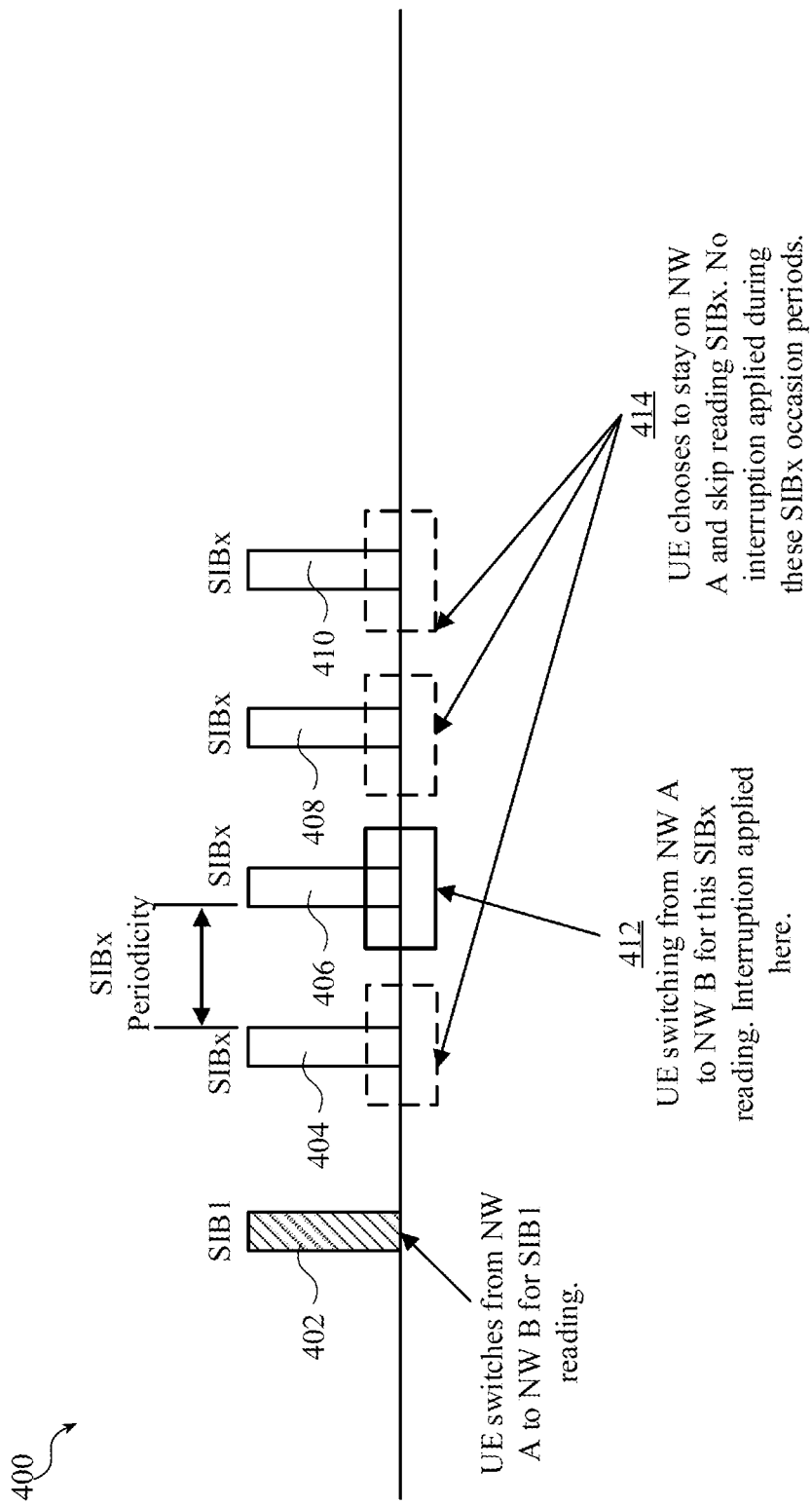
FIG. 4 illustrates an example of operations of a system information (SI) reading without a request according to various aspects.

Referring to FIG. 4, illustrated is an example SI reading of SI information 400 without an SI request according to various aspects herein. Here, it is assumed that NW A can be a network or cell of a base station such as gNB 111*a* with components of system/device 200 or 300 and NW B can be another network or cell of another base station such as gNB 111*b* with components of system/device 200 or 300 also. NW A can be assumed to be the serving network cell while NW B the secondary connected network or target network for being monitored or switched to for SI. A serving cell or network refers to the cell which is used by UE at a current moment so the UE 101 has the base or control connection with this serving cell on NW A, while NW B is the target network (NW) for UE 101 to monitor, measure or detect in dual SIM operations such that when moving from one network to another the UE 101 can seamless move therebetween.

The UE 101 (e.g., as 200, 300, or the like) can be configured to process an SI reading without performing an SI request so that the NW B could use SIB 1 to schedule the corresponding periodical SI such as SIB 2, SIB 3, SIB 4, etc., denoted as SIBx, wherein x can be an integer of 1 plus n, with n being an integer greater than zero, for example. The SIBx are based on scheduling information of SIB1. Such that, the UE 101 has to read the SIB 1 first in order to then understand the scheduling information and then receive/process one or more following SIBs based on the SIB 1 scheduling information (e.g., timing information, frequency domain information, or other scheduling information). Here, the UE 101 operates for SI reading without having to request any SI from NW B. The UE 101 is without current flexibility to request anything from NW B and only listens/monitors NW B to find out the scheduling and timing information of the SIBs. Based on the scheduled SIB occasions, the UE can receive/process the SI.

In the illustration, the SI of NW B of gNB 111b, for example, includes SIB1 402, and one or more other SIBs 404 thru 410. The UE 101 can be configured to perform an interruption based SI reading according to the SIB1 scheduling information for other SIBs. The UE 101 is configured to interrupt NW A or the serving cell of gNB 111a, for example, in order to autonomously switch to NW B for reading the SIB1 402. The interruption can be uncontrolled by NW A or out of control by NW A of gNB 111a.

When referring to the autonomous interruption or UE based interruption herein, either for SI reading operation or SI requesting operation, interruption refers to the UE being able to determine when to perform an SI request/reading that is independent of the serving network/cell, and the UE 101 culling (by stopping or filtering) any information, messaging or communication with the serving network/cell. Culling this information/messaging/communication can refer to the UE 101 tuning by radio frequency or otherwise to the target network (e.g., NW B of gNB 111b), performing reception at the target or second network and then re-tuning back to the serving network of gNB 111a, for example. Autonomous interruption can be a UE based interruption as referred to here or a UE configured interruption, for example, or the like.

Autonomous interruption by the UE 101 is different from and in contrast to a network configured or preconfigured measurement gap configured where the serving network/cell triggers or determines when to perform an SI reading/request for SI from NW B. In contrast to autonomous interruption by the UE, the preconfigured measurement gap or network configured measurement gap can include any one or more of: a gap offset, a gap pattern, a gap periodicity, or a measurement gap length, for example, which enables the UE 101 to then perform the SI reading/request instead of determining a measurement gap configuration autonomously itself. In other words, with SI reading/request based on a preconfigured measurement gap configuration for the serving or primary network that the UE 101 is currently connected to primarily, the gap window for these operations (SI reading/request) is under control of the network; compared to the autonomous interruption or UE based interruption where the UE autonomously performs these operations independent of the serving cell.

The UE 101 can be configured to initiate interruption based SI reading according to SIB1 scheduling information for other SIs or SIBs 404, 406, 408, etc. The UE 101 can configure an interruption period 412. First, the UE 101 reads the SIB1 402 to obtain SI for other SIBs by switching from the serving cell NW A to NW B. For the following SIBx, four SIBx occasions 404 thru 410 occur based on a SIBx periodicity and the SI from the previous SIB1.

In aspect, UE 101 can determine which SIBx will be received and processed. In this example illustration, the UE 101 can tune its reception for a second SIBx 406, for example, at a second SIBx occasion period. The UE 101 configures the interruption period 412 by tuning from NW A to NW B for the SIB reading to determine further SI and then culling serving cell data traffic within the solid line block interruption period 412. At SIBx occasion periods 414, however, the UE 101 can choose to tune or remain on NW A without interruption of traffic and skip reading of these SIBs 404, 408, 410 of the SI. The NW A does not control which SIBx the UE 101 should read, but rather everything in the SI reading can be decided by the UE 101 itself.

In an aspect, the interruption period for the interruption based SI reading can be represented as follows: {RF tuning time (from NW A to NW B)+SIBx occasion window+RF tuning back time (from NW B to NW A)}. The interruption period thus includes an RF tuning time to the NW B, the SIBx occasion that the UE 101 determines to read or that follows the SIB1, and the time for tuning back to the NW A serving cell.

Interruption 412 could be the opportune time for the UE to cull or create an interruption period or interruption window (e.g., 412), in which for this the UE 101 can round the interruption period to a resource slot level with resource elements, for example. For example, the absolute time may be about 2.5 ms, then the UE may round it to the nearest slot level, for example, 3 slots if the total slot length is 3 ms.

FIG. 4 specifically illustrates utilizing an interrupt for SIBx reading, instead of an SI request for an SI reading. The UE 101 can first read the SIB1 402 in order to understand how the follow SIBx 404 thru 410 will be transmitted. For example, the UE 101 can determine at least how often the SIBx will be transmitted from the NW side, the SIBx periodicity, and the SIBx offset, and which SIBx the UE 101 is going to read can be autonomously determined by the UE 101 according to the information obtained by the SIB1 and current conditions/resources (traffic load, measurements, etc.) at the UE 101, for example. For example, if the UE has very heavy traffic on NW A, the UE may wait to cull the information to current traffic and delay the SIBx reading after switching back to the NW A and reading the SIB1 402. As such, the UE 101 can dynamically balance a current condition/situation without necessarily informing the NW A of gNB 111a.

In an aspect, the gNB 111a does not have control over the SIB reading when the UE 101 utilizes the interruption based SI reading and does not necessarily know when the UE 101 may decide to perform the autonomous interruption. The gNB 111a of NW A can continue to schedule traffic regardless of any UE based interruption, but can determine an expectation or estimation of the UE's condition according to a ratio as an ACK/NACK loss ratio representing an interruption period divided by 4×SIBx periodicities. By this expectation, the gNB 111a can schedule the UE 101, determine what is the traffic load or traffic throughput, and whether it would like to schedule the UE 101 at this time. In one example, the expectation can be a ratio based on an ACK/NACK interruption during Y milliseconds, in which Y can be an integer. As such, the expectation could be during a whole SI reading time period in a certain range, e.g., x % ACK/NACK interruption during Y ms. In the following example, x %={interruption period/4* SIBx periodicity}, and Y=4*SIBx periodicity. If there were 10 SIBx, for example, or more then Y could equal 10 (or greater)*SIBx periodicities for 10 (or greater) SIBx occasions. In this manner, the serving network/cell or gNB 111a can determine future behavior for example how to schedule to the UE and the traffic load that can be scheduled to the UE with MUSIM.

Figure 5:
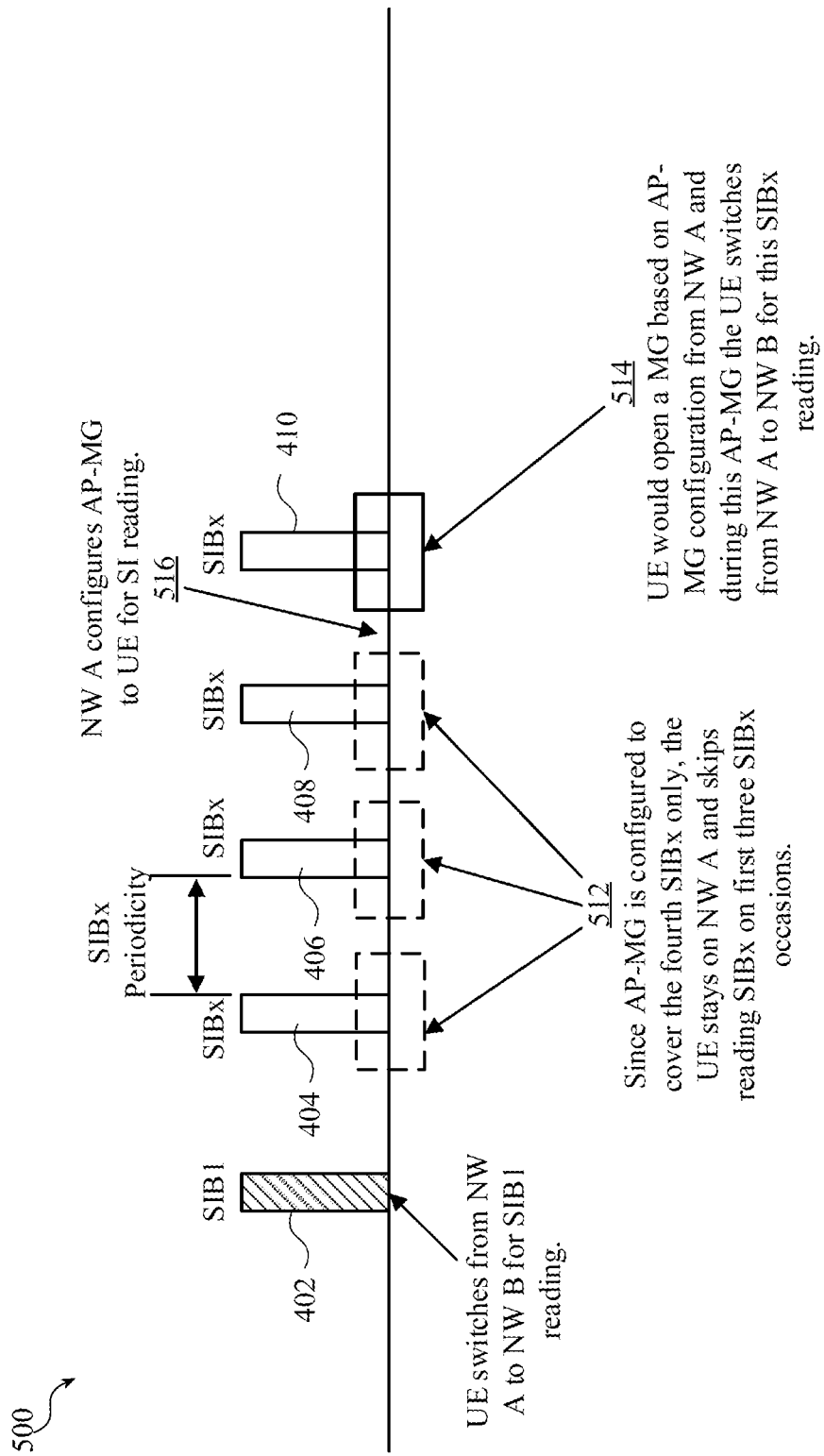
FIG. 5 illustrates another example of operations of a system information (SI) reading without a request according to various aspects.

Referring to FIG. 5, illustrated is another example of SI reading of SI information 500 without an SI request according to various aspects herein. Like FIG. 4, the UE 101 switches from a serving NW as NW A to a target NW as NW B for a SIB1 reading to obtain system information for reading any one of the SIBxes following thereafter in time. In this illustrated example, the UE 101 can perform an aperiodic MG (AP-MG) based SI reading according to SIB1 scheduling information for other SIBs or SI.

In the Illustrated example, the UE 101 relies on a network measurement gap configuration or a pre-configured measurement gap configuration to perform SI reading of SI for NW B. From the UE perspective, the UE 101 follows the AP MG timing configuration to switch from NW A to NW B for SI reading from an MG configuration obtain by NW A, the serving cell of gNB 111*a*. NW A informs the UE 101 where the AP MG is at or located, such as at 516, for example, for SIBx 410. Receiving an AP-MG means that a measurement gap window can only be reserved for a one-time use (e.g., one SIBx or one duration as configured). Thus, in response to receiving the AP-MG, the UE 101 is informed of when and where the AP window is that the UE needs to switch to from NW A to NW B. The UE 101 can also receive a preconfigured measurement gap length and a time offset to locate the MG window and cover the SIBx for reading during this time frame. During use of AP MG window by the UE 101 for reading a SIBx, the connection of NW A would be disconnected or in a disconnection state. Thus, at 514 SIBx occasions the UE 101 can process an MG configuration based on an AP-MG configuration from NW A so that during the AP-MG the UE 101 can switch from NW A to NW B for this SIBx reading (e.g., SIBx 410, if the NW A indicates this SIBx for the AP-MG. At 512, SIBx 404, 406, and 408 could therefore be skipped so that the AP-MG covers the fourth SIBx only. Although SIBx 4 is configured to correspond with the AP-MG, any one of the other SIBx could also be configured to correspond instead; likewise, if more than four SIBx are scheduled by the SIB1, for example.

In an aspect, from the NW A of gNB 111*a* or serving cell perspective, the NW A serving cell can configure the AP MG to control when UE can switch from NW A to NW B for the SI reading. The gNB 111*a* can configure the AP MG to cover at least one target cell SIBx. Here, the serving network can determine whether it would like to give the UE 101 more chances to cover or decode the SIBx or not (e.g., more than one SIBx). If the NW only configures the UE 101 one chance or one shot, then this AP MG can be used to only cover one target cell SIBx. However, if the NW would like to give the UE 101 more chances or measurement gap window instances, then the AP-MG can cover more than one target cell SIBx occasion by extending the gap length/duration, and then during this measurement gap window the UE could have multiple chances to read the SIBx.

In the illustrated example of FIG. 5, the gNB 111*a* can configure separate measurement gaps configured for SIB1 402 and a SIBx (404, 406, 408, 410) reading, respectively. The SIB1 reading can be configured using a periodic measurement gap or P-MG, while a SIBx can be configured using the AP-MG in a measurement gap configuration. Because the SIB1 402 is utilized for the SIBx reading, the UE 101 could successfully perform the SIB1 reading before the SIBx reading. As such, the SIB1 402 reading can be configured to use the periodical measurement gap or the AP MG, and the SIB1 reading can be configured to use a different measurement gap configuration than from the SIBx reading according to a measurement gap configured provided by the NW A.

In an aspect, if a different measurement gap is used for the SIBx reading than from the SIB 1 reading, the AP MG could be designed to be greater than or equal to {RF tuning time (from NW A to NW B)+SIBx occasion window+RF tuning time (from NW B to NW A)}, for example. Because the measurement gap is configured by the serving network NW A, rounding to another slot level is not necessary by the UE 101.

Figure 6:
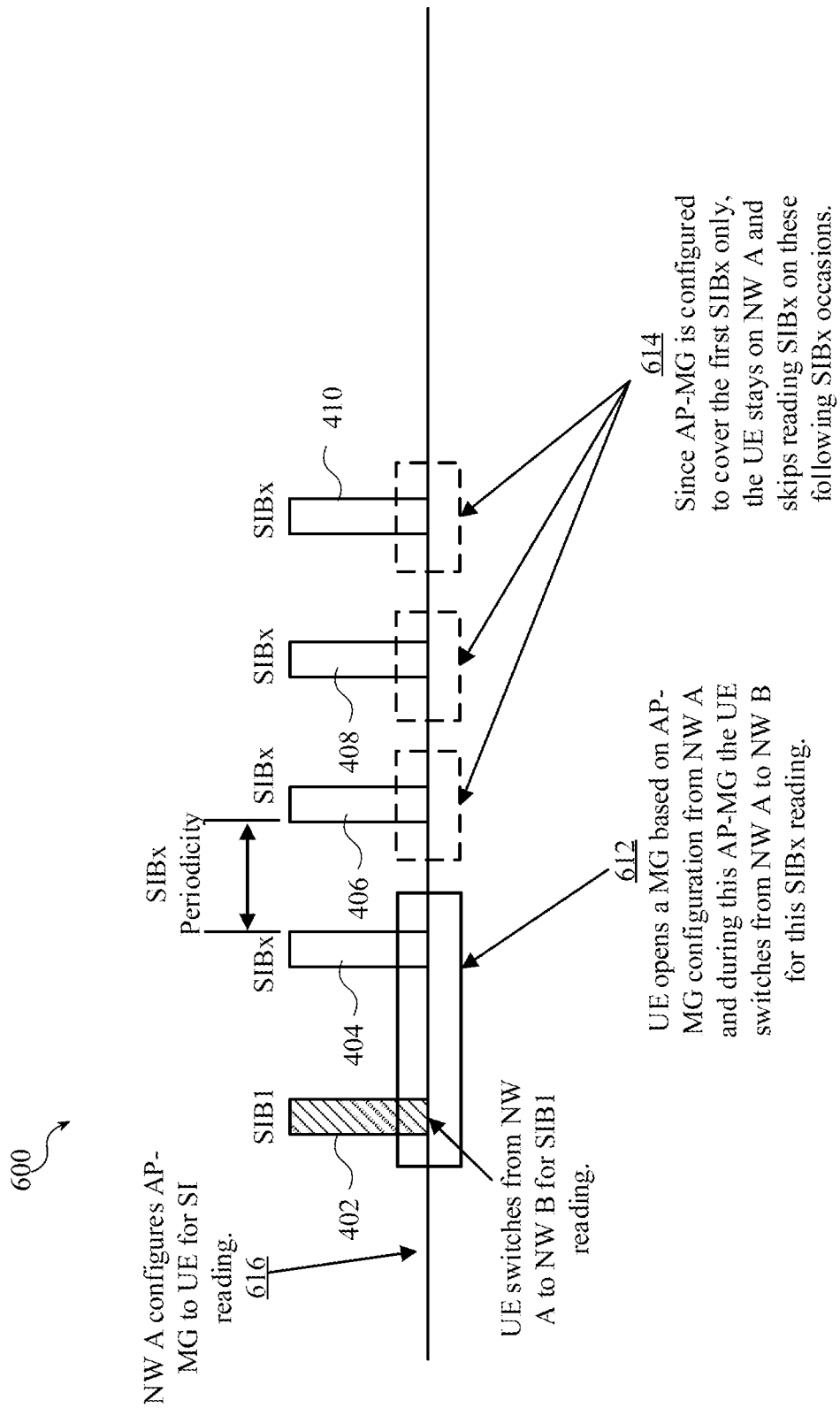
FIG. 6 illustrates another example of operations of a system information (SI) reading without a request according to various aspects.

Referring to FIG. 6, illustrated is another example of SI reading of SI information 600 without an SI request according to various aspects herein. Like FIGS. 4 and 5, the UE 101 switches from a serving NW as NW A to a target NW as NW B for a SIB1 402 reading to obtain system information for reading one of the SIBxes following thereafter in time. In this illustrated example, the UE 101 can perform an aperiodic MG (AP-MG) based SI reading according to SIB1 scheduling information for other SIBs or SI at 616, and specifically the SIBx 404 directly following the SIB 1 402. The UE switches from NW A to NW B for SIB1 reading. When processing the MG configuration from NW A, the UE 101 reads both SIB 1 402 and SIBx 404 in the same AP-MG configured with a measurement gap time length covering both at 612 without switching back to the NW A and tuning back to NW B a second time. At 614, since the AP-MG is configured to cover only the first SIBx 404 that follows the SIB1 402, the UE 101 tunes back to NW A without reading SIBx 406, 408 and 410 that follow SIBx 404 or skips reading these SIBxes on the following SIBx occasions.

In an aspect, the gNB 111*a* of serving NW A can determine whether a time gap/measurement gap time between the SIB1 and SIBx satisfies an interval threshold (Tinterval). If the measurement gap time between SIB1 and SIBx is smaller than or within the Tinterval, gNB 111*a* of NW A configures one single AP MG for SIB1 402 and the following SIBx 404 reading. The MG configuration thus utilizes the AP-MG to cover two SI occasions (e.g., SIB1 402 and SIBx 404/SIB2). The MG length (or the measurement gap window) can be configured to be greater than or equal to {RF tuning time (from NW A to NW B)+time period from beginning of SIB1 occasion window to the end of following SIBx occasion window+RF tuning back time (from NW B to NW A)}. This configuration can be controlled by the NW A, which can check whether SIB1 402 and SIBx 404 satisfies the threshold Tinterval and falls within the measurement gap time. If the measurement gap time for SIB 1 402 and SIBx 404 is small and below this threshold, then the NW A can configure one measurement gap with a longer measurement gap length to cover both SIB1 and the following SIBx reading. Otherwise, if the measurement gap time between SIB1 and SIBx is greater than or equal to Tinterval, the gNB 111*a* can configure separate measurement gaps for the SIB1 402 reading and the SIBx 404 reading, respectively (e.g., P-MG for SIB1 and AP-MG for SIBx, or vice versa).

Alternatively, or additionally, Tinterval could be hard-coded in spec (as predefined) or could be configured/indicated by the network. In aspect, the UE 101 could receive the threshold and indicate to the NW A whether an assigned AP-MG satisfies reading both SIB1 402 and SIBx 404; if not, the NW A can configure different measurements gaps thereafter or at another instance, for example.

Figure 7:
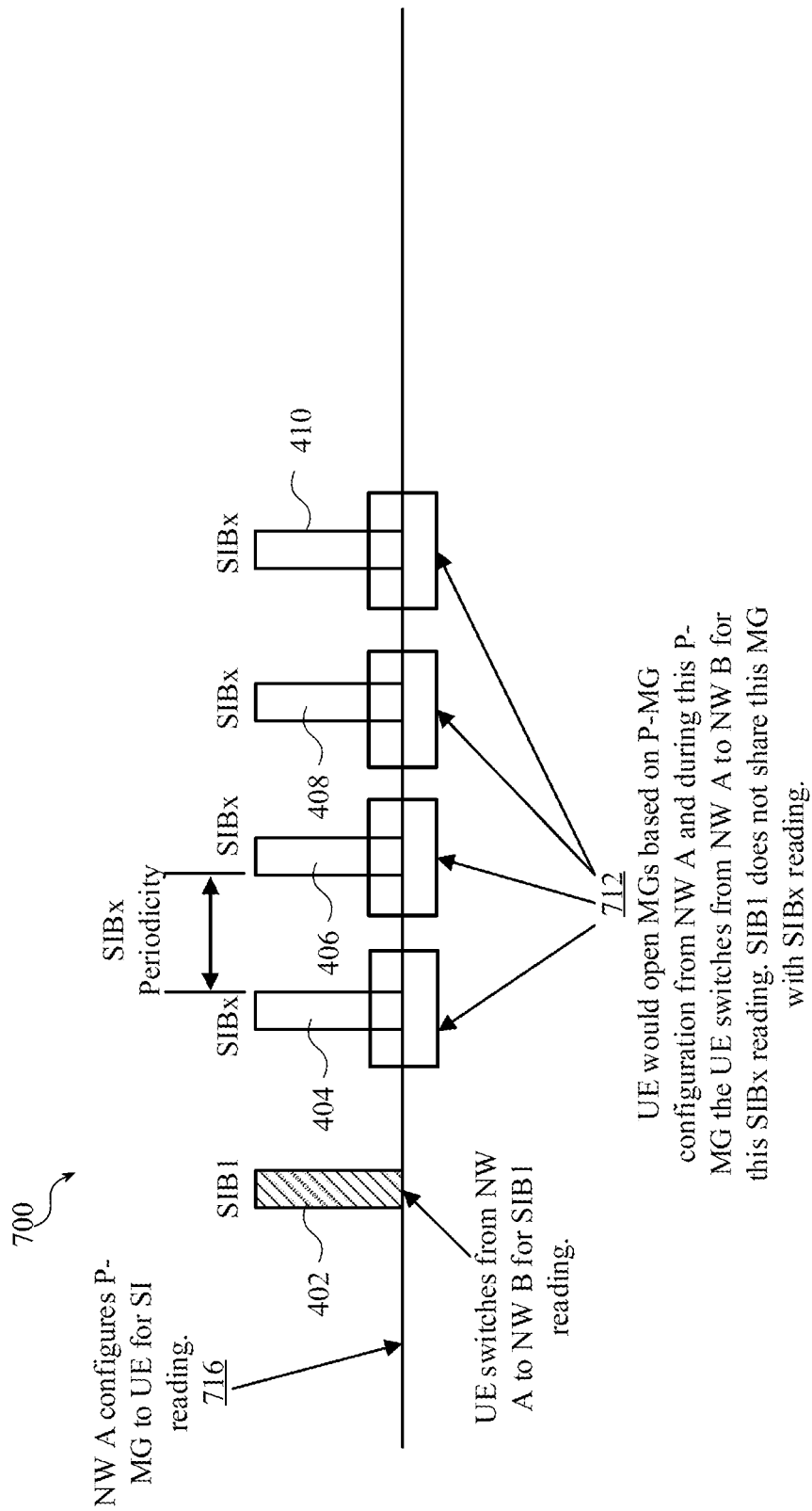
FIG. 7 illustrates another example of operations of a system information (SI) reading without a request according to various aspects.

Referring to FIG. 7, illustrated is another example of SI reading of SI information 700 without an SI request according to various aspects herein. Like FIGS. 4 thru and 6, the UE 101 switches from a serving NW as NW A to a target NW as NW B for a SIB1 402 reading to obtain system information for reading one of the SIBxes following thereafter in time. The UE 101 can perform periodic MG (P-MG) based SI readings according to SIB1 scheduling information for other SIs.

In the illustrated example, NW A configures a P-MG or P-MG pattern to the UE 101 for SI reading. The UE 101 switches from the NW A to the NW B for SIB 1 reading. Then at 712, the UE 101 process measurement gaps based on a measurement gap configure or a P-MG configuration from NW A. During the P-MG or P-MG pattern the UE 101 switches from NW A to NW B before each SIBx 404 thru 410 reading. Here, the SIB1 does not share the measurement gap with the SIBx readings necessarily.

In an aspect, the UE 101 can configure/follow the P-MG timing configuration to switch from NW A to NW B for SI reading and obtain all the information to cover the measurement gap window(s), for example. The UE 101 could thus have a pre-configured MG length and time offset to locate the MG window and cover the SIBx 404 through 410. During P-MG window(s) the connection of NW A would be disconnected.

Here, the UE 101 can be configured to make a determination of whether the SIBx MG pattern of the P-MG pattern can cover the SIB1 occasion, or vice versa, whether the P-MG pattern covers the SIB1 occasion and the SIBx MG patterns based on their timing configuration or time offset(s). If not, the UE can use different P-MG patterns for SIBx 404 thru 410 reading and SIB1 402 reading.

Figure 8:
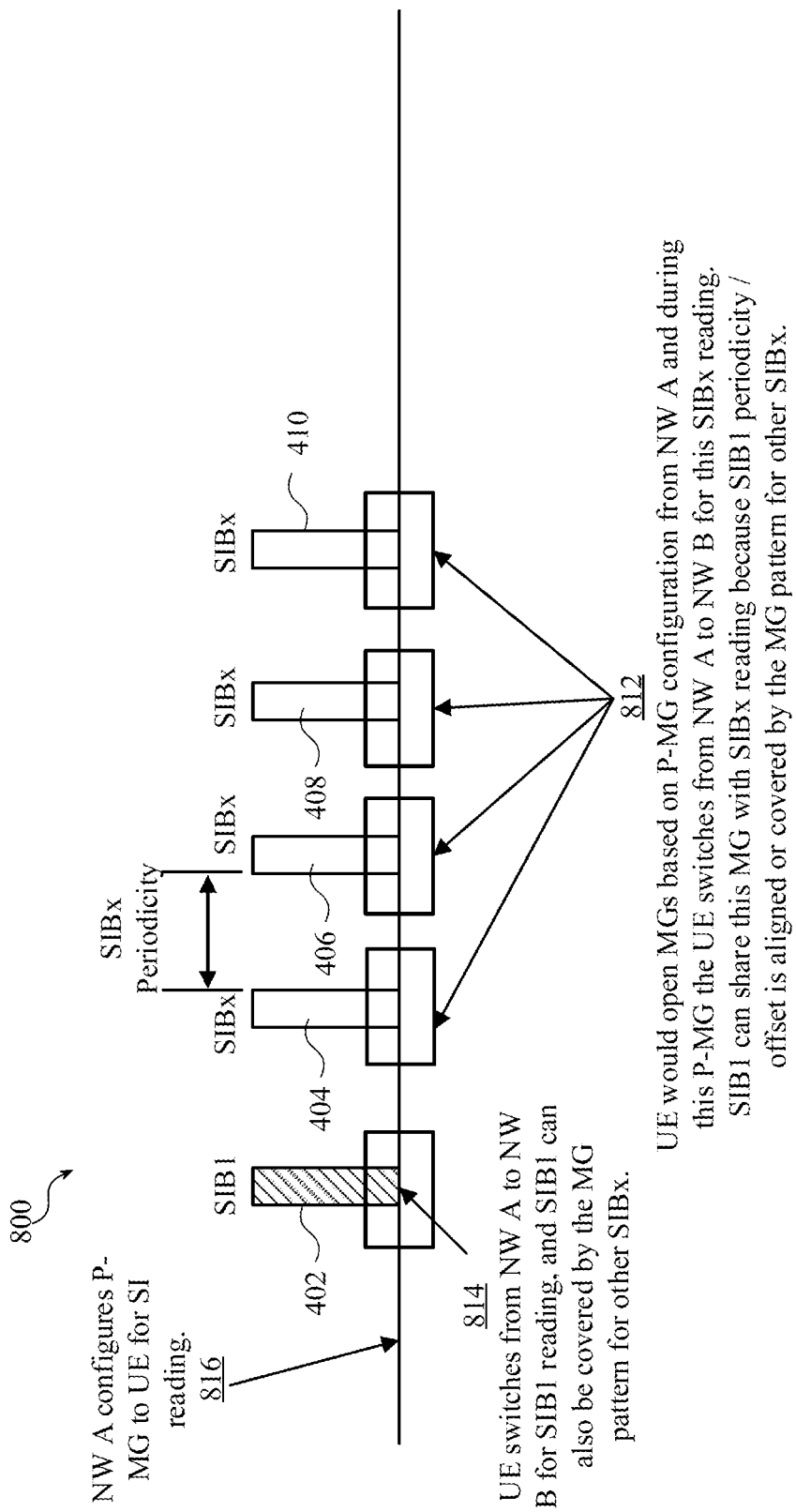
FIG. 8 illustrates another example of operations of a system information (SI) reading without a request according to various aspects.

If yes, then the UE 101 can use a single P-MG pattern for both SIB1 402 and SIBx 404 thru 410 reading as illustrated, for example, at FIG. 8. For example, if the P-MG pattern is 20 ms for each measurement gap window across and if UE finds those 20 ms periodicity can also fit the SIB1 402 and the SIBx 404, 406, 408, 410 reading then the UE may use this single measurement gap pattern to do the SIB1 402 and SIBx reading for one or more of the SIBxes 404 thru 410. However, if the UE 101 determines that this measurement gap pattern cannot fit both the SIB1 and one or more of the SIBxes 404 thru 410, then the UE 101 could use separate P-MG gap patterns for SIB1 and SIBx reading. How the measurement gap patterns are configured can be configured according to the NW A, either based on the NW A communication with NW B, the UE or other component, the NW A can configure different P-MG patterns for the UE 101. The NW A can know or determine the SIB timing information (e.g., offset, periodicity or the like) and use this information to configure different P-MG patterns, for example.

Alternatively, or additionally, if the NW A determines that SIB1 402 and SIBx 404 thru 410 share the same periodicity, then the NW may choose to configure only one single measurement gap pattern that can cover both SIB1 and SIBx reading. But if the NW finds that SIB1 and SIBx of NW B have timing offsets that are quite different and/or their periodicities are different, then NW A can configure separate measurement gap patterns for SIB1 and SIBx, respectively.

In an aspect, the NW A serving cell can configure the P-MG to control when UE 101 could periodically switch from NW A to NW B, and this P-MG can be configured to cover at least one target SIBx 404, 406, 408, or 410, for example.

Referring to FIG. 7, in which separate and different MGs can be configured for SIB1 reading and SIBx reading, respectively, the MG length in this case can be greater than or equal to {RF tuning time (from NW A to NW B)+SIBx occasion window +RF tuning time (from NW B to NW A)}. In this situation, the gNB 111a can configure the measurement gap length to every measurement gap periodically in a measurement gap pattern, and the P-MG periodicity can be equal to or greater than SIBx periodicity, if the P-MG is only used for SIBx reading. In order to not share this MG with other UE behaviors unnecessarily the P-MG periodicity can be equal to or greater than the SIBx periodicity, which means that each MG window can cover this SIBx occasion; otherwise, the P-MG periodicity could be smaller than a SIBx periodicity if the P-MG is also used for other mobility based measurements (e.g., a cell measurement on NW B).

Referring to FIG. 8, is another example of SI reading of SI information 800 without an SI request according to various aspects herein. Like FIGS. 4 thru and 7, the UE 101 switches from a serving NW as NW A to a target NW as NW B for a SIB1 402 reading to obtain system information for reading one of the SIBxes following thereafter in time. The UE 101 can perform periodic MG (P-MG) based SI readings according to SIB1 scheduling information for other SIs. At 816, the NW A configures P-MG to the UE for SI reading. At 814, the UE 101 switches from NW A to NW B for SIB1 reading, and SIB1 can be covered by the same MG pattern configured for other SIBx 404 thru 410, for example. A such, a single MG pattern can be configured for SIB1 reading and SIBx reading if the SIB1 and SIBx can fit in a same periodic MG pattern. Then the MG length in this case can be greater than or equal to {RF tuning time (from NW A to NW B)+max {between a SIBx occasion window and a SIB1 occasion window}+RF tuning time (from NW B to NW A)}. This means multiple SIB occasion windows can be configured for the MG periodicity for each window size. Because both SIB1 and SIBx are being covered, then this window can be configured at the maximum of the SIB1 and SIBx SI occasion window.

Alternatively, or additionally, the measurement gap length can be configured to be greater than or equal to {RF tuning time (from NW A to NW B)+time period from beginning of SIB1 occasion window to the end of following SIBx occasion window+RF tuning time (from NW B to NW A)}. In this case the SIB1 and SIBx occasion windows could be combined because there is a longer MG window to cover both SIB1 402 and SIBx 404, and for other SIBx readings only one SIBx MG configuration could be configured.

Additionally, or alternatively, the P-MG periodicity can be equal to or greater than min {SIB1 periodicity, and SIBx periodicity} if the P-MG is only used for SIBx and SIB1 reading; in this case we are using single measurement gap pattern to read both SIB1 and SIBx when not being used for other cell measurements. However, if the measurement gap pattern is being used for other cell mobility measurements, then the P-MG periodicity could be smaller than min {SIB1 periodicity, and SIBx periodicity}.

Figure 9:
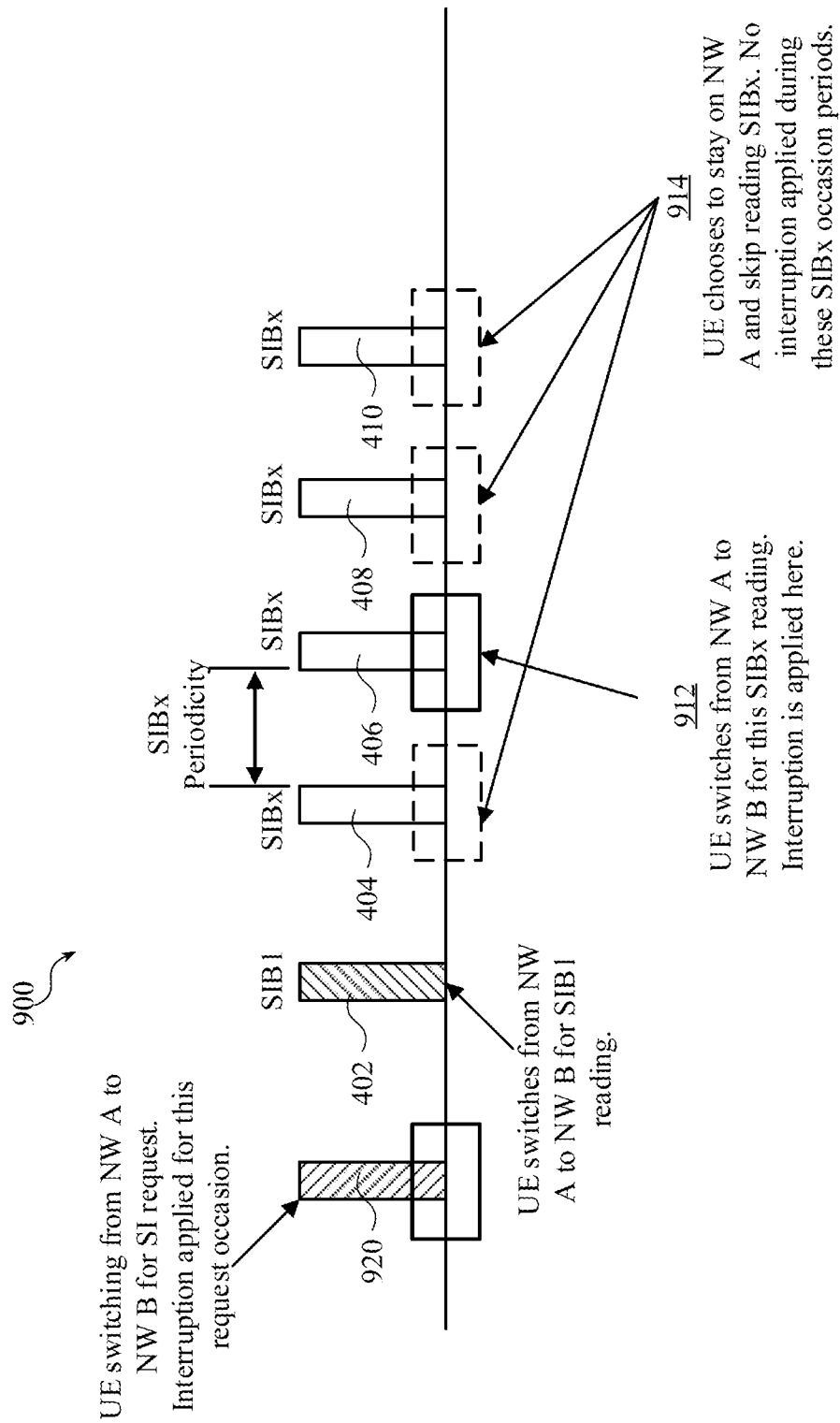
FIG. 9 illustrates an example of operations of a system information (SI) request and reading according to various aspects.
Figure 10:
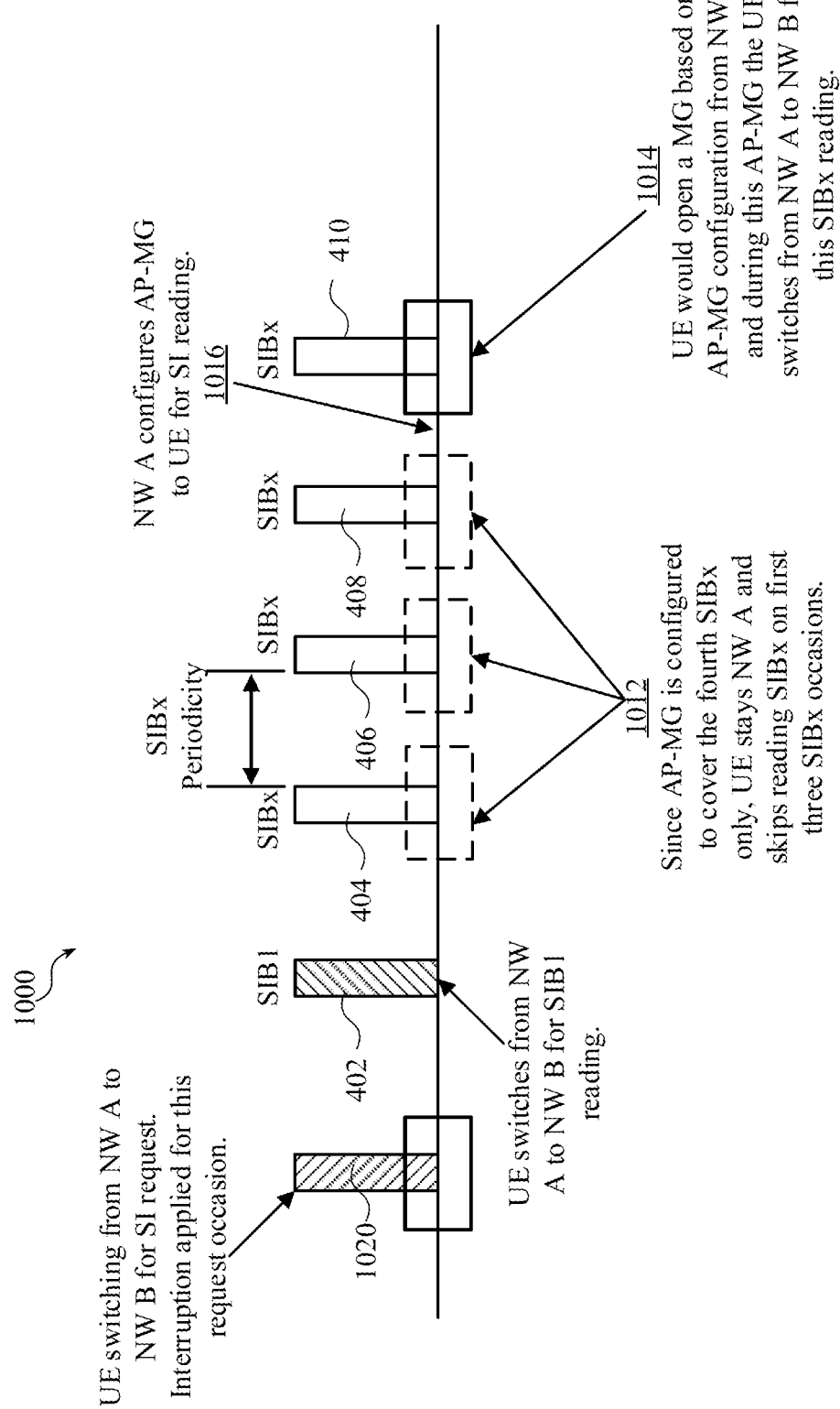
FIG. 10 illustrates another example of operations of a system information (SI) request and reading according to various aspects.

FIGS. 9 and 10 illustrate examples of SI reading with an SI request in accordance with various aspects. SI reading with request can refer to network B using a SIB1 to schedule the corresponding periodic SIs (other SIBs except SIB1). For other SIs, UE 101 can be configured to request such other SI from NW B. As illustrated, the main difference is an additional stage before SIBx and SIB1 reading with the UE switching from the NW A to NW B to make an SI request 920. After the request, the UE 101 can switch from NW A to NW B again to receive the SIB1 402. In response to the SI request, NW B can schedule the SIBx to be read also. The NW B can indicate to the UE 101 that based on the SI request 920, additionally scheduled new SIBx could be scheduled. Then the SIBx information can relies upon or be dependent on both the network in SIB1 and also on the request by the UE before the SIB1 402 is read.

In various aspects/embodiments herein, for SI request and SI reading up to nine combinations of MG configuration can be used separately or in combination for both reading and request operations. For example, for SI reading one or more of: interruption/AP MG/P MG can be configured by the UE or gNB of the serving network. In addition, for the SI request operations the following can also be used separately or in combination: interruption/AP-MG/P-MG. The is can be represented as: interruption/AP-MG/P-MG based SI request+Interruption/AP-MG/P-MG based SI reading.

Although all combinations are not necessarily directly illustrated including the SI request 920, FIG. 9 illustrates interruption based SI request+interruption based SI reading, and FIG. 10 an example of interruption based SI request+ AP-MG based SI reading, for examples.

FIG. 9 illustrates an example of the UE 101 being configured to perform an interruption based SI request. As discussed above in reference to FIG. 4, interruption herein can refer to the connection with NW A can be disconnected temporarily during this interruption period. When to apply the interruption for SI reading is decided by the UE 101 and the network cannot control it (different from MG configuration from network).

At 916, the UE can switch from NW A to NW B for an SI request. The interruption can be applied for the request occasion (solid box at the timeline of SI, at SI request 920). At 912, the UE can switch from NW A to NW B for the SIBx reading and also apply an interruption period for a SIBx of choice (e.g., SIBx 406 with the solid box denoting the SIBx MG occasion window). At 914, the UE 101 can choose to stay on the NW A and skip reading the SIBx, in which case no interruption is applied during these SIBx occasion periods.

In various aspects, the interruption period for the SI request 920 can be configured differently depending on whether the SI request comprises a MSG1 based on-demand SI procedure utilizing Message 1 transmission and Message 2 reception with the NW B, or utilizing a MSG3 based on-demand SI procedure. For example, if MSG1 based on-demand SI procedure is used, and the UE 101 is using multiple individual interruptions, then interruption period for MSG1 (transmission)/MGS2 (reception) respectively, can be represented as: {RF tuning time (from NW A to NW B)+MSG1/MSG2 occasion period+RF tuning time (from NW B to NW A)}. This interruption period can be rounded to a slot level, as with aspects described in FIG. 4 or herein this disclosure. If interruption used for MSG 1 only, then the MSG 1 period is used for determining the interruption period. Likewise, if MSG 2 is used for the interruption, then it can be this period, or both periods for MSG1 and MSG2, as rounded for the interruption to the next slot level. If the UE 101 is using a single interruption for MSG1 and MSG2, then the interruption period is {RF tuning time (from NW A to NW B)+time period from beginning of MSG1 occasion to the end of MSG2 occasion+RF tuning time (from NW B to NW A)}, as rounded to a slot level. The advantage here is UE can stay in NW B and does not need to tune back between these messages (MSG1 and MSG2). AS at 914, the UE 101 stays on NW B and does transmission on Message 1 and waits for the response on Message 2, and only when the UE finishes all those stages, then the UE can tune back from NW B to NW A.

Alternatively, or additionally, the UE 101 can utilize a MSG3 based on-demand SI procedure, with the difference from the MSG 1 based on-demand procedure being that four types of messages are considered: Message 1 (transmission), Message 2 (reception), Message 3 (another transmission) and Message 4 (another reception). Likewise, if UE 101 configures multiple individual interruptions (interruption windows), then each window relies on the different message type occasion period. As such, the interruption period for MSG1/MGS2/MSG3/MSG4 respectively, can be represented as: {RF tuning time (from NW A to NW B)+MSG1/ MGS2/MSG3/MSG4 occasion period +RF tuning time (from NW B to NW A)}, in which alternatively or additionally this interruption period can also be rounded to a slot level. Alternatively, or additionally, if the UE 101 configures a single interruption window for MSG1/2/3/4, then all of the messages are accounted for, and the interruption period can be longer. The UE 101 can configure the interruption period as represented as {RF tuning time (from NW A to NW B)+time period from beginning of MSG1 occasion to the end of MSG4 occasion+RF tuning time (from NW B to NW A)} in which alternatively or additionally this interruption period can also be rounded to a slot level.

Other aspects can also be configured by the UE 101 or serving network of gNB 111a, for example, with the up to nine different combinations in mind for SI request and SI reading as described within the entirety of this disclosure.

FIG. 10 illustrates another example of SI reading with an SI request in accordance with various aspects. At the SI request 1020, the UE 101 can switch from NW A to NW B to make an SI request as an interruption based request as described in FIG. 9, while performing the SI reading based on an AP-MG, for example. Alternatively, or additionally, any one or more aspects described herein for a P-MG or P-MG pattern could also be used alone or in combination for SI reading.

At 1012, for example, the UE 101 can be configured via an MG configuration to cove the fourth SIBx 410 only and skip the first three SIBx 404, 406 and 408, for example, or a different SIBx. The UE 101 can remain on the NW A serving cell and skip reading the first three SIBx, until the fourth SIBx is to be read and then switching for SI reading on the NW B for SI reading of the fourth SIBx 410.

The UE 101 can also be configured or perform an AP-MG or P-MG based SI request according to any one or more of the SI reading aspects described herein.

The UE 101 can follow the AP-MG timing configuration to switch from NW A to NW B for SI request, which can indicate when the UE 101 is to use the AP-MG for SI reading. In one example, the UE 101 could have one pre-configured MG length and time offset to locate the MG window to cover the MSG1/2 for MSG 1 based on-demand SI procedure or cover the MSG1/2/3/4 for MSG3 based on-demand SI procedure. During AP MG window the connection of NW A can be disconnected by the UE or gNB 111a.

In another example, the UE 101 can have multiple pre-configured AP-MG lengths and time offsets to locate multiple MG windows to respectively cover MSG1/2 for MSG 1 based on-demand SI procedure or cover the MSG1/2/3/4 for MSG3 based on-demand SI procedure, and during all AP MG windows the connection of NW A could be disconnected.

The NW A can configure, for example, one AP-MG to cover the MSG1/2 for MSG 1 based on-demand SI procedure or cover the MSG1/2/3/4 for MSG3 based on-demand SI procedure. For MSG 1 based on-demand SI procedure, the AP MG length in this case can be greater than or equal to {RF tuning time (from NW A to NW B)+time period from beginning of MSG1 occasion to the end of MSG2 occasion+ RF tuning time (from NW B to NW A)}. As such, NW A as the serving cell can ensure the one time MG (AP-MG) can cover both MSG1 and MSG2. NW A can configure UE to stay in NW B until the UE successfully finishes the SI request based on MSG1/2/3/4.

For MSG 3 based on-demand SI procedure, the AP MG length can be greater than or equal to {RF tuning time (from NW A to NW B)+time period from beginning of MSG1 occasion to the end of MSG4 occasion+RF tuning time (from NW B to NW A)}. Here, NW A can allocate/configure for the UE a longer time to ensure the UE 101 tunes back to NW A.

In another aspect, the NW A can configure multiple individual AP MGs to respectively cover MSG1/2 for MSG 1 based on-demand SI procedure or cover the MSG1/2/3/4 for MSG3 based on-demand SI procedure. For example, the AP MG covers MSG1, and after MSG1 transmission UE 101 can tune back to NWA. The AP MG can also cover MSG2 occasion for the MSG 1 based on demand SI procedure. As such, the UE 101 tunes back and forth several times between the two networks more often during the MSG1/2/3/4 reception and transmission, respectively. In this case, the AP-MG length can be greater than or equal to {RF tuning time (from NW A to NW B)+corresponding MSG occasion+RF tuning time (from NW B to NW A)}. The AP MG length in this case shall be greater than or equal to corresponding MSG occasion window because for each occasion window there can be different AP MG configurations from the network.

In other various aspects, the UE 101 can be configured to perform a P-MG based SI request. The UE 101 follows the configuration from the NW and the UE 101 can determine whether the P-MG for SI request can cover the SI occasion window or not. If a same single measurement gap pattern can cover the SI request and SI reading, then the UE can configure the single pattern for this purpose; otherwise, the UE may use a different pattern to do the SI request and another one for SI reading, for example.

The UE can follow the P-MG timing configuration to switch from NW A to NW B for SI request, for example. UE 101 can process a periodical pre-configured MG length and time offset to locate the periodical MG windows to cover the MSG1/2 for MSG 1 based on-demand SI procedure or cover the MSG1/2/3/4 for MSG3 based on-demand SI procedure, in which during these periodical P-MG windows the connection of NW A can be disconnected. The UE can determine if the P-MG pattern for SI request could cover SIBx occasion window and vice versa. If yes, the UE can use a single P-MG pattern for both SI request and SIBx reading. Otherwise, UE would use a P-MG pattern for SI request and use interruption or AP-MG or another P-MG pattern for the SIBx reading.

The NW A can control whether a single or multiple MG pattern is used by the UE 101 because the NW can determine whether the SI request occasion and the SIBx or SIB1 reading can fit into the same MG pattern or not. If the SI request occasion and the SIBx window cannot fit into the P-MG, then a separate MG pattern can be configured, and each MG pattern length would be up to the corresponding message occasions which is similar to the previous AP MG measurement gap occasion and all the measurement gap patterns can depend on which message type is being received or transmitted. The NW A serving cell can also configure the P-MG to control when UE could periodically switch from NW A to NW B, and this P-MG would be configured to cover the corresponding MSGs needed for the SI request.

In an aspect, separate MG patterns can be configured for SI request and SIBx reading respectively, if the SI request occasion and SIBx window cannot fit in a periodic MG pattern. The MG length in this case for the SI request can be greater than or equal to {RF tuning time (from NW A to NW B)+max {MSGs for the corresponding SI request method}+RF tuning time (from NW B to NW A)}. For example, if using the MSG1 based SI request, the maximum is then between the message 1 and message 2; and if using the MSG3 base procedure, then the maximum is between the message 1/2/3/4.

Alternatively, or additionally, a single P-MG pattern can be configured for SI request and SIBx reading if the SI request occasion and SIBx can fit in the same periodic MG pattern. The MG length in this case shall be greater than or equal to {RF tuning time (from NW A to NW B)+max {SIBx occasion window (which is for the SIB reading), and MSGs for the corresponding SI request method}+RF tuning time (from NW B to NW A)}. Here, the max {SIBx occasion window, MSGs for the corresponding SI request method} can be, for example, a max {SIBx occasion window, MSG1 occasion window, MSG2 occasion window} if MSG1 based request is used. Thus, this is a maximum function between the SIB1 and the messages and corresponding message window that depends on the SI request method MSG1 based method or MSG1 based message.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example can be a user equipment (UE), comprising: a memory; and a processing circuitry coupled to multiple universal subscriber identity modules (MUSIM) with dual subscriber identify modules (SIMs), the processing circuitry configured to: communicatively couple to a serving network; and perform, based on a UE configured interruption or a preconfigured measurement gap configuration, at least one of: a system information (SI) request or an SI reading of a target network to obtain SI that includes a system information block (SIB) 1 and at least one other SIB associated with the target network.

A second example can include the first example, wherein the processing circuitry is further configured to: in response to performing the SI reading based on the UE configured interruption, tuning to the target network from the serving network, while culling traffic with the serving network, wherein the UE configured interruption comprises an interruption period between the UE and the serving network that is based on a first radio frequency (RF) tuning time from the serving network to the target network, an occasion window of the at least one other SIB and a second RF tuning time from the target network to the serving network.

A third example can include the first or second example, wherein the preconfigured measurement gap configuration comprises at least one of: an aperiodic measurement gap (AP-MG) configuration or a periodic measurement gap (P-MG) configuration, and comprises an indication of at least one of: a measurement gap length, a measurement gap offset, a measurement gap pattern or a measurement gap periodicity.

A fourth example can include any one or more of the first through third examples, wherein the processing circuitry is further configured to: in response to performing the SI reading based on the preconfigured measurement gap configuration, read the SIB1 according to an P-MG configuration and read the at least one other SIB according to an AP-MG configuration, wherein the AP-MG configuration comprises an AP-MG length that is greater than or equal to a first radio frequency (RF) tuning time from the serving network to the target network plus an occasion window of the at least one other SIB and plus a second RF tuning time from the target network to the serving network.

A fifth example can include any one or more of the first through fourth examples, wherein the processing circuitry is further configured to: determine whether a time gap between the SIB1 and the at least one other SIB is greater than or equal to a threshold interval; in response to the time gap being less than the threshold interval, perform the SI reading of the SIB1 and the at least one other SIB based on a single AP-MG, wherein a measurement gap length of the single AP-MG is based on a time period from a beginning of a SIB1 occasion window to an end of a following other SIB occasion window.

A sixth example can include any one or more of the first through fifth examples, wherein the processing circuitry is further configured to: read the SIB1 and the at least one other SIB within a P-MG pattern of a P-MG configuration, in response to performing the SI reading based on the preconfigured measurement gap configuration.

A seventh example can include any one or more of the first through sixth examples, wherein the processing circuitry is further configured to: determine whether a P-MG pattern of a P-MG configuration covers a pattern of the at least one other SIB and an occasion window of the SIB1; in response to the P-MG pattern not covering both the at least one other SIB and the occasion window of the SIB1, utilizing different P-MG patterns for the SIB1 reading and the at least one other SIB reading; and in response to the P-MG pattern covering both the at least one other SIB and the occasion window of the SIB1, utilizing the P-MG pattern by switching from the serving network to the target network and back to the serving network when reading the SIB1 and when reading each of the at least one other SIB.

An eighth example can include any one or more of the first through seventh examples, wherein the processing circuitry is further configured to: in response to performing the SI request based on the UE configured interruption, tuning to the target network from the serving network, while culling traffic with the serving network, to request the at least one other SIB associated with the target network; wherein the UE configured interruption comprises an interruption period that is based on a message 1 (MSG1) based on-demand SI procedure or a message 3 (MSG3) based on-demand SI procedure, wherein the MSG1 based on-demand SI procedure comprises a first single interruption or a first plurality of individual interruptions associated with a MSG1 transmission and a MSG2 reception, respectively, and wherein the MSG3 based on-demand SI procedure comprises a second single interruption or a second plurality of individual interruptions associated with the MSG1 transmission, the MSG2 reception, a MSG 3 transmission and a message 4 (MSG4) reception, respectively.

A ninth example can include any one or more of the first through eighth examples, wherein the processing circuitry is further configured to: in response to performing the SI request based on the preconfigured measurement gap configuration: configure one or more pre-configured AP-MG lengths and one or more time offsets to locate one or more measurement gap windows to cover a MSG1 based on-demand SI procedure or a MSG3 based on-demand SI procedure; or configure a P-MG configuration to periodically switch from the serving network to the target network comprising one or more P-MG patterns based on whether a single P-MG pattern covers SI request occasions and SI reading occasions, and, in response to the single P-MG not covering both, the P-MG configuration is configured to include the single P-MG for the SI request and a UE configured interruption or an AP-MG or another P-MG pattern for the SIB1 reading or the at least one other SIB reading.

A tenth example can base station comprising: a memory, and processing circuitry configured to: configure a measurement gap configuration to enable at least one of: a system information (SI) request or an SI reading at a target network; and transmit the measurement gap configuration to a UE, wherein the measurement gap configuration, wherein the measurement gap configuration comprises at least one of: an aperiodic measurement gap (AP-MG) or a periodic measurement gap (P-MG) that controls when a UE switches to the target network for a system information block (SIB) 1 reading and at least one other SIB.

An eleventh example can include tenth example, wherein the AP-MG comprises a one shot measurement gap for one SIB of the at least one other SIB, and the P-MG comprises a different measurement gap for the SIB1, wherein an AP-MG length is greater than or equal to a first radio frequency (RF) tuning time from a serving network of the base station to the target network plus an occasion window of the at least one other SIB and plus a second RF tuning time from the target network to the serving network.

A twelfth example can include any one or more of the tenth through the eleventh example, wherein the processing circuitry is further configured to: in response to a time gap between the SIB1 and the at least one other SIB is less than a threshold interval, configure a AP-MG for the SIB1 and the at least one other SIB, wherein an AP-MG length is greater than or equal to a first radio frequency (RF) tuning time from a serving network of the base station to the target network plus a time period from a beginning of a SIB1 occasion window to an end of a following other SIB occasion window plus a second RF tuning time from the target network to the serving network.

A thirteenth example can include the any one or more of the tenth through the twelfth example, wherein the processing circuitry is further configured to: configure separate P-MGs that enable the UE to periodically switch from a serving network of the base station to the target network to read the SIB1 and between the SIB1 and each of the at least one other SIB, in response to the SIB1 and the at least one other SIB having different time offsets from a periodic P-MG pattern, wherein a measurement gap length of a P-MG for the at least one SIB is greater than or equal to a first RF tuning time to the target network plus an at least one other SIB occasion window plus a second RF tuning time to a serving network of the base station, and wherein a P-MG periodicity is greater than or equal to at least one other SIB periodicity when the P-MG is used for the at least one other SIB reading and smaller than the at least one other SIB periodicity if the P-MG is additionally used for any other mobility based measurement.

A fourteenth example can include any one or more of the tenth through the thirteenth examples, wherein the processing circuitry is further configured to: configure the P-MG only for the SIB1 and the at least one other SIB in response to the SIB1 and the at least one other SIB fitting into a periodic MG pattern, wherein a measurement gap length of the P-MG is greater than or equal to a first RF tuning time to the target network plus a maximum time period from a beginning of a SIB1 occasion window to an end of a following other SIB occasion window (or a maximum time of a SIB1 occasion window and an at least one other SIB window) plus a second RF tuning time to a serving network of the base station, and wherein a P-MG periodicity of the P-MG is greater than or equal to a SIB1 periodicity and at least one other SIB periodicity when the P-MG is used for the at least one other SIB reading and smaller than a minimum of the SIB1 periodicity and the at least one other SIB periodicity if the P-MG is additionally used for any other mobility based measurement.

A fifteenth example can include any one or more of the tenth through the fourteenth examples, wherein the processing circuitry is further configured to: configure one or more pre-configured AP-MG lengths and one or more time offsets to locate one or more measurement gap windows to cover a MSG1 based on-demand SI procedure or a MSG3 based on-demand SI procedure, wherein an AP-MG length of the MSG1 based on-demand SI procedure comprises an RF tuning time to the target network, a time period from a beginning of an MSG1 occasion to an end of an MSG2 occasion (or corresponding MSG occasion) and a tuning time back to a serving network of the base station, and wherein an AP-MG length of the MSG3 based on-demand SI procedure comprises the RF tuning time to the target network, a time period from a beginning of an MSG1 occasion to an end of an MSG4 occasion (or corresponding MSG occasion), and the tuning time back to the serving network of the base station.

A sixteenth example can include any one or more of the tenth through the fifteenth examples, wherein the processing circuitry is further configured to: configure a P-MG configuration to periodically switch to the target network comprising one or more P-MG patterns based on whether a single P-MG pattern covers the SI request procedure and the SI reading, and, in response to the single P-MG not covering both, configure the P-MG configuration to include the single P-MG for the SI request and an AP-MG or another P-MG pattern for the at least one other SIB reading.

A seventeenth example can include any one or more of the tenth through the sixteenth examples, wherein a measurement gap length of the single P-MG is greater than or equal to an RF tuning time to the target network, a maximum of an at least one other SIB occasion window and message windows for the SI request, and a tuning back time to a serving network of the base station.

An eighteenth example can be baseband processor comprising: a memory, and a processing circuitry coupled to multiple universal subscriber identity modules (MUSIM) with dual subscriber identify modules (SIMs), the processing circuitry configured to: communicatively couple to a serving network; and perform, based on a UE configured interruption or a preconfigured measurement gap configuration, at least one of: a system information (SI) request or an SI reading of a target network to obtain SI that includes a system information block (SIB) 1 and at least one other SIB of SI associated with the target network.

A nineteenth example can include the eighteenth example, wherein the processing circuitry is further configured to: provide an SI request to the target network to schedule the at least one other SIB for the SI reading; or perform the SI reading without providing an SI request to the target network.

A twentieth example includes any one or more of the eighteenth through nineteenth examples, wherein the processing circuitry is further configured to: wherein the preconfigured measurement gap configuration comprises at least one of: an aperiodic measurement gap (AP-MG) or a periodic measurement gap (P-MG) that controls switching to the target network for reading or requesting the SIB1 and the at least one other SIB.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:
1. A user equipment (UE), comprising:
multiple universal subscriber identity module (MUSIM) circuitry;

a memory; and processing circuitry coupled to the MUSIM circuitry and the memory, the processing circuitry configured to execute instructions stored in the memory to cause the UE to:

communicatively couple to a serving network; and receive radio resource control (RRC) signaling including a measurement gap configuration for at least one of: a periodic measurement gap (P-MG), or an aperiodic measurement gap (AP-MG);

switch, within the P-MG or the AP-MG, from the serving network to a target network; and receive a system information block (SIB) from the target network within the P-MG or the AP-MG.

2. The UE of claim 1, wherein the measurement gap configuration comprises at least one of:

a measurement gap length, a measurement gap offset, a measurement gap pattern, or a measurement gap periodicity.

3. The UE of claim 1, wherein the SIB comprises a SIB 1, and wherein the processing circuitry is further configured to cause the UE to:

in response to performing system information (SI) reading based on the measurement gap configuration included in the RRC signaling, read the SIB1 within the P-MG and read at least one other SIB within the AP-MG, wherein a length of the AP-MG is greater than or equal to a first radio frequency (RF) tuning time from the serving network to the target network, plus an occasion window of the at least one other SIB, plus a second RF tuning time from the target network to the serving network.

4. The UE of claim 1, wherein the SIB comprises a SIB1, and wherein the processing circuitry is further configured to cause the UE to:

determine whether a time gap between the SIB1 and at least one other SIB is greater than or equal to a threshold interval; and in response to the time gap being less than the threshold interval, perform a system information (SI) reading of the SIB1 and the at least one other SIB based on a single AP-MG, wherein a measurement gap length of the single AP-MG is based on a time period from a beginning of a SIB1 occasion window to an end of a following other SIB occasion window.

5. The UE of claim 1, wherein the SIB comprises a SIB1, and wherein the processing circuitry is further configured to cause the UE to:

read the SIB1 and at least one other SIB within the P-MG, in response to performing system information (SI) reading based on the measurement gap configuration included in the RRC signaling.

6. The UE of claim 1, wherein the SIB comprises a SIB 1, and wherein the processing circuitry is further configured to cause the UE to:

determine whether a P-MG pattern associated with the P-MG covers a pattern of at least one other SIB and an occasion window of the SIB1;

in response to the P-MG pattern not covering the pattern of the at least one other SIB and the occasion window of the SIB1, utilize different P-MG patterns to read the SIB1 and the at least one other SIB; and in response to the P-MG pattern covering both the pattern of the at least one other SIB and the occasion window of the SIB1, utilize the P-MG pattern when reading the SIB1 and when reading each of the at least one other SIB.

7. A base station comprising:

radio frequency (RF) circuitry;

a memory; and processing circuitry configured to execute instructions stored in the memory to cause the base station to:

generate a measurement gap configuration for a system information (SI) reading on a target network, wherein the measurement gap configuration controls when a user equipment (UE) switches to the target network to read a system information block (SIB) 1 and at least one other SIB; and transmit the measurement gap configuration to the UE via the RF circuitry, wherein the measurement gap configuration comprises at least one of: an aperiodic measurement gap (AP-MG) or a periodic measurement gap (P-MG).

8. The base station of claim 7, wherein the AP-MG comprises a one shot measurement gap for one SIB of the at least one other SIB, and the P-MG comprises a different measurement gap for the SIB1, wherein an AP-MG length is greater than or equal to a first RF tuning time from a serving network of the base station to the target network, plus an occasion window of the at least one other SIB, plus a second RF tuning time from the target network to the serving network.

9. The base station of claim 7, wherein the processing circuitry is further configured to cause the base station to:

in response to a time gap between the SIB1 and the at least one other SIB being less than a threshold interval, configure an AP-MG for the SIB1 and the at least one other SIB, wherein an AP-MG length is greater than or equal to a first RF tuning time from a serving network of the base station to the target network, plus a time period from a beginning of a SIB1 occasion window to an end of a following other SIB occasion window, plus a second RF tuning time from the target network to the serving network.

10. The base station of claim 7, wherein the processing circuitry is further configured to cause the base station to:

configure only the P-MG for the SIB1 and the at least one other SIB, in response to the SIB1 and the at least one other SIB fitting into a periodic MG pattern;

wherein a measurement gap length of the P-MG is greater than or equal to a first RF tuning time to the target network, plus a maximum time period from a beginning of a SIB1 occasion window to an end of a following other SIB occasion window plus a second RF tuning time to a serving network of the base station; and wherein a P-MG periodicity of the P-MG is greater than or equal to a SIB1 periodicity and at least one other SIB periodicity.

11. The base station of claim 7, wherein the processing circuitry is further configured to:

configure a P-MG configuration to periodically switch to the target network, wherein the P-MG configuration comprises one or more P-MG patterns based on whether a single P-MG pattern covers the SI request and the SI reading.

12. The base station of claim 11, wherein a measurement gap length of the single P-MG pattern is greater than or equal to an RF tuning time to the target network, a maximum of at least one other SIB occasion window and message windows for the SI request, and a tuning back time to a serving network of the base station.

13. A baseband processor configured to, when executing instructions stored in a memory, perform operations comprising:

communicatively coupling to a serving network;
receiving radio resource control (RRC) signaling including a measurement gap configuration for at least one of: a periodic measurement gap (P-MG) or an aperiodic measurement gap (AP-MG), the P-MG or AP-MG to be used for multiple universal subscriber identity module (MUSIM) operation;
switching, within the P-MG or the AP-MG, from the serving network to a target network; and
receiving a system information block (SIB) from the target network within the P-MG or the AP-MG.

14. The baseband processor of claim 13, wherein the operations further comprise:
providing, based on the measurement gap configuration, a system information (SI) request to the target network to obtain the SIB.

15. The baseband processor of claim 13, wherein the operations further comprise:
receiving the SIB without providing a system information (SI) request to the target network.

16. The UE of claim 1, wherein the UE is in a disconnected state with the serving network within the P-MG or the AP-MG.

17. The base station of claim 7, wherein the UE is in a disconnected state with a serving network of the base station within P-MG or the AP-MG.

18. The baseband processor of claim 13, wherein the operations further comprise entering a disconnected state with the serving network within P-MG or the AP-MG.

* * * * *